SIGNAL TRANSLATING SYSTEM

Filed Aug. 25, 1961

INVENTOR.
HENRY M. BACH, JR.
BY Eugene M. Whitacre
ATTORNEY

INVENTOR.
HENRY M. BACH, JR.
BY Eugene M. Whitacre
ATTORNEY

United States Patent Office 3,420,954

Patented Jan. 7, 1969

3,420,954

SIGNAL TRANSLATING SYSTEM

Henry M. Bach, Jr., Princeton, N.J., assignor to Radio Corporation of America, a corporation of Delaware Filed Aug. 25, 1961, Ser. No. 133,918
U.S. Cl. 179—1 22 Claims
Int. Cl. H04m 1/00; H03f 3/00; H03f 3/68

The present invention relates to signal translating systems, and more particularly to dual-channel signal amplifiers or detectors of the type providing separate-channel signal translation for stereophonic sound reproduction in radio, phonograph and like equipment. The addition of dual-channel signal-translating and reproducing means in stereophonic sound reproducing equipment of this type normally adds appreciably to the cost of manufacture and to the overall size, whereas such equipments are preferably relatively small in size, and cost reduction is desirable.

It is therefore a primary object of the present invention to provide an improved audio-frequency amplifier or detector stage for stereophonic signal translating systems and the like, which is adapted for efficient dual-channel signal translation using a single electronic tube and a simplified output circuit therefor.

It is also an object of the present invention, to provide an improved, low-cost audio-frequency amplifier for stereophonic or dual-channel signals which effectively maintains channel separation and provides simplified output signal matrixing circuitry.

It is a further object of this invention, to provide an improved dual-channel stereophonic signal amplifier or detector utilizing a single multigrid electronic tube device and output circuit means therefor capable of providing two-phase or push-pull operation for one signal component of two applied stereophonically-related signals and single-phase or single-ended operation for a second signal component of said stereophonically-related signals. Matrixing for both signal components may be provided in the same circuit.

It is also a further object of this invention, to provide an improved single-tube stereophonic signal translating detector and amplifier having a simplified matrixing output circuit for deriving two stereophonically-related signals from modulated stereophonic carrier waves.

As is known, a pair of stereophonically-related audio-frequency signals may be derived from a common sound source by the proper placement of two spaced sound pickup devices, such as microphones, connected with suitable dual-channel signal translating circuit means. The audio-frequency signal from one microphone may be designated as the (A) signal and the audio-frequency signal from the other microphone may be designated as the (B) signal. In stereophonic radio signal transmitting and receiving systems, such as are proposed for broadcast use in the entertainment field, a radio-frequency signal wave is modulated by such A and B signals and can be received and reproduced monophonically by standard broadcast band or FM-band receivers, as well as by special receivers for stereophonic sound reproduction. The signal translating system of the present invention is best adapted for this use in small, low-cost stereo radio receivers, and likewise for low-cost dual-channel signal amplification in connection with stereophonic phonograph equipment.

For stereophonic phonograph equipment, the A and B signals are recorded in the side walls of the V-shaped microgroove sound track in the usual disc-type phonograph record. The recorded A and B signals may thus be translated directly from the groove walls through the stereophonic phonograph pickup device into the dual signal channels of the present system. In AM broadcast and FM stereo receiver circuits the received A and B signals may have been mixed or matrixed to provide two new stereophonically-related signals one of which may be the sum of the original A and B signals $(A+B)$, and the other of which may be the difference of the original A and B signals $(A-B)$. These may likewise be translated by the present system.

In accordance with proposed stereo broadcast systems, a function of the $(A+B)$ signal may be used to either frequency-modulate or amplitude-modulate the carrier wave of the transmitter, while a function of the $(A-B)$ signal may be used to either angle-modulate the carrier wave or amplitude-modulate the subcarrier wave of the transmitter. In either FM or AM type of stereophonic receiver, the $(A+B)$ and $(A-B)$ signals are combined in matrixing circuits to produce the individual A and B signals, which are then applied to separate amplifiers and loudspeakers devices to provide stereophonic sound reproduction. In the phonograph record reproduction systems, for stereophonic operation, the dual-channel amplifier likewise provides signals for the separate channel loudspeaker means and any amplifying elements required therefor.

In accordance with the invention, a dual-channel signal translating stage, which is particularly adapted for stereophonic radio, phonograph and like signal amplifying and translating systems, is provided by relatively low-cost circuit means in connection with a single electronic-tube amplifier device of the type having effectively a single electron stream or space path. In a preferred embodiment of the invention, the single tube is of the pentode type having first, second and third grids or grid elements, interposed between a cathode and a plate or anode, between which the electron stream flows.

The first and third grids are signal input or control electrodes while the second electrode is the screen grid. In the present system, the anode and the screen grid are effectively electron collector electrodes which are each maintained at a positive D-C potential with respect to the cathode to set up the electron discharge or space-current flow from the cathode. The total cathode or space current is varied in accordance with an impressed signal voltage on first control grid, i.e., the grid nearest the cathode and the division of this space current between the anode and screen grid, i.e., the electron collector electrodes, is varied differentially in accordance with an impressed signal voltage on the third grid, which is disposed between the collector electrodes. The third grid is ineffectual in altering the total space current. The single electron-tube device may include a fourth grid or grid element interposed between the screen grid and the first control grid. This device also may have a divided anode structure to provide the two collector electrodes, and a beam-deflection type of electron-stream control means, in lieu of the third grid or grid element, and may be provided by any suitable beam-deflection amplifier tube.

In operation with the pentode, for example, the cathode or space current variation is determined by, or is a function of, the signal potential between the first grid and the cathode and is substantially independent of the signal potential between the third grid and the cathode. The division of the cathode or space current between the anode and the second or screen grid is determined by, or is a function of, the signal potential between the third grid and the cathode and is substantially independent of the signal potential between the first grid and the cathode.

If one of two stereophonically-related signals, such as the (B) signal, is applied between the first grid and the cathode, a corresponding variation in total cathode current results. This is the controlled space current flowing from the cathode to both the second or screen grid and the anode or plate. These latter elements are connected in push-pull relation to suitable balanced or push-pull output-circuit impedance means. Single-ended output coupling impedance means is connected between an intermediate tap on the push-pull circuit and a source of positive operating potential for the tube anode and screen-grid elements. Thus the B signal is developed across the single-ended output impedance means but produces no differential current in the pushpull output circuit impedance means.

The other signal (A) is applied between the third grid (second control grid) and the cathode. This produces no effective change in the total cathode or space current and accordingly produces no effective signal output across the single-ended output impedance means for the (B) signal. However the (A) signal causes a change in the anode current, accompanied by a change in the opposite direction in the screen-grid current, i.e., differentially changes the division of cathode current between anode and screen grid and therefore produces a signal output across the push-pull or differential output impedance means. In this way the two signals are translated separately through the single electron stream. If the tube geometry is such that the anode and screen grid currents are equal, the intermediate tap on the push-pull circuit or impedance element may be substantially at the center thereof.

The use of a fourth grid reduces any tendency for cross talk to develop between the two translated signals through the amplifier. The divided anode or deflection-type amplifier device may provide an effective driver for the push-pull circuit or balanced output circuit for one of the signal components as above described.

If the applied stereophonically-related signals are of the composite type such as $(A+B)$ and $(A-B)$, the push-pull and single-ended circuits may be followed by a usual form of matrixing circuit such as that involving two transformers with secondary connections in any suitable and well known configuration for this purpose. However this system may provide matrixing for composite signal components, such as $(A+B)$ and $(A-B)$, in the same output network through dual-channel output circuit coupling to the anode and screen grid elements, or collector electrodes, across the combined output coupling impedance means provided by this network.

In an FM-multiplex radio signal receiver of the stereophonic type, the FM detector and multiplex detector output circuits, for example, may be connected to apply the demodulated $(A+B)$ FM signal component and the demodulated $(A-B)$ suppressed subcarrier signal component for application to the single-tube amplifier, and matrixing for the A and B signals may be provided conventionally or by the matrixing circuit output connections referred to. Thus in an amplitude-modulation (AM) stereophonic signal receiver, the single-tube amplifier may serve as a matrixing detector for stereophonically-modulated carrier waves without the use of additional matrixing means, which is a further advantage of the signal-translating means of the present invention.

The invention will further be understood from the following description when considered in connection with the accompanying drawings, and its scope is pointed out in the appended claims.

In the drawings, FIGURE 1 is a schematic circuit diagram of a single-tube dual-channel audio-frequency signal translating stage or amplifier embodying the invention;

Figures 1, 2, 3, 4:
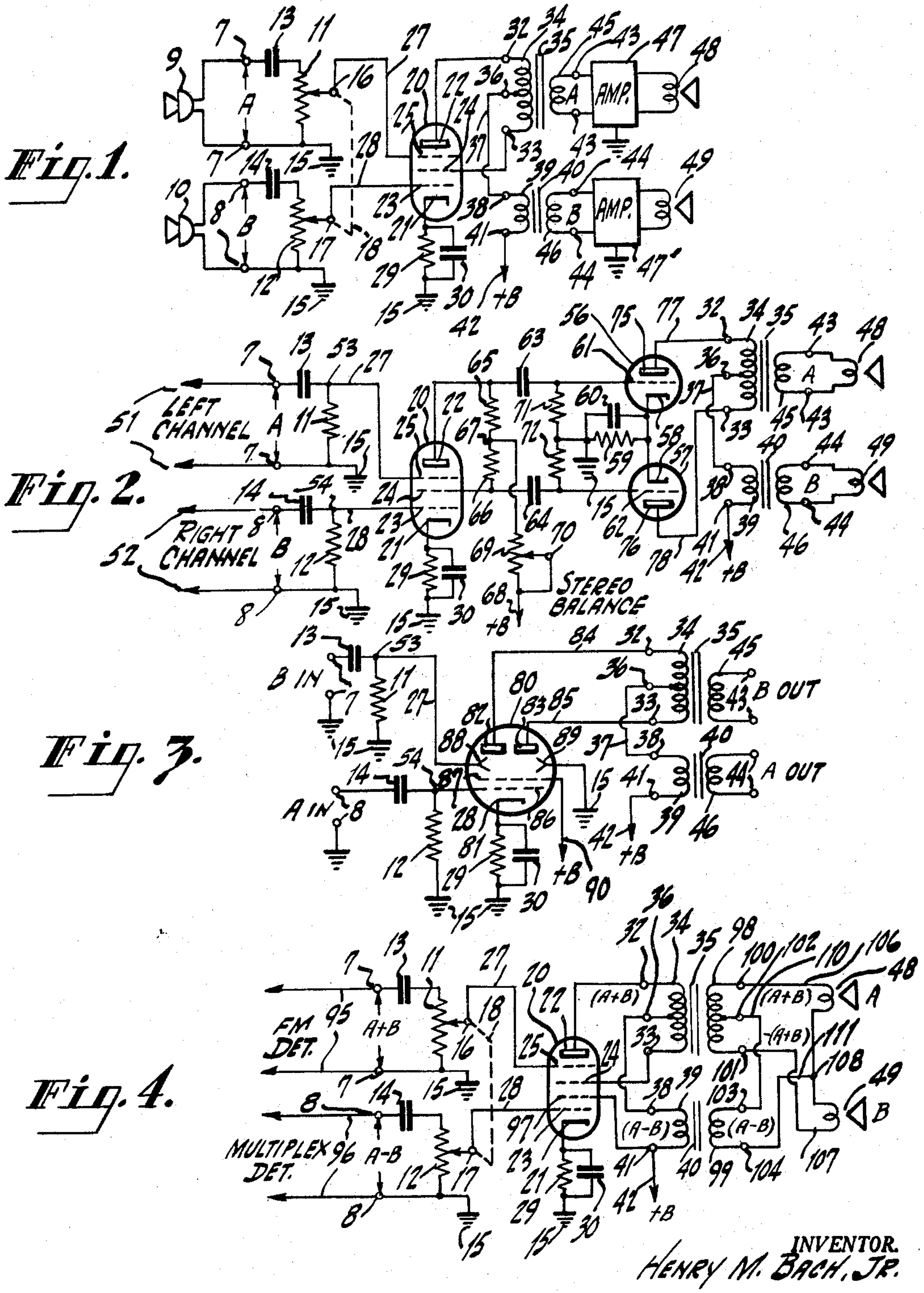
FIGURE 2 is a schematic circuit diagram of a single-tube dual-channel amplifier stage as shown in FIGURE 1, modified in accordance with the invention to provide additional internal dual-channel amplification and balance.
FIGURE 3 is a schematic circuit diagram of a single-tube dual-channel signal translating stage similar to that shown in FIGURE 1, modified in accordance with the invention to include an electron-discharge device of the beam-deflection type.
FIGURE 4 is a schematic circuit diagram of a single-tube dual-channel amplifier stage similar to that of FIGURE 1, with modifications, in accordance with the invention, for use in connection with a stereophonic radio signal receiver of the FM multiplex type.
Figure 5:
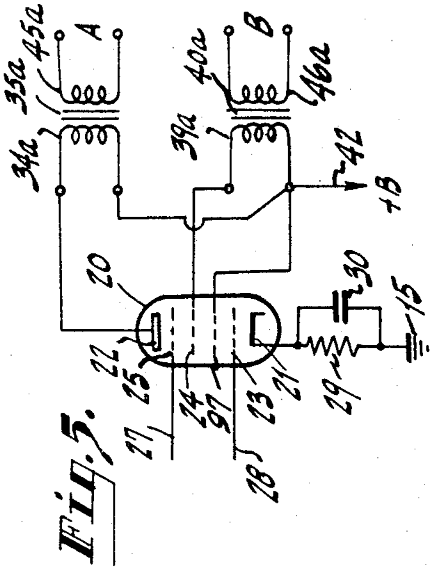
Figure 6:
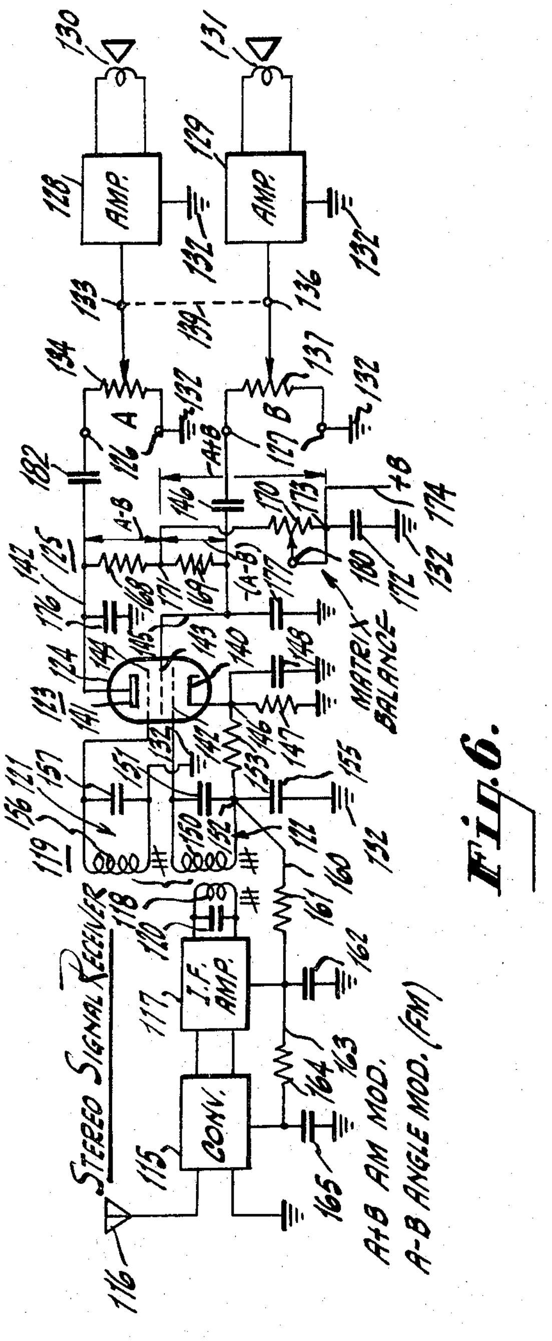

FIGURE 5 is a schematic circuit diagram of a portion of the amplifier stage of FIGURE 4 showing a modification thereof in accordance with the invention; and FIGURE 6 is a schematic circuit diagram of a complete (AM) (FM) amplitude-modulation angle modulation, stereophonic signal receiver showing single-tube dual-channel amplifier means which may be utilized as a stereophonic signal detector and matrixing means in such receiver in accordance with the invention.

Referring to the drawings, wherein like reference numerals are applied to like circuits and circuit elements throughout, and referring particularly to FIGURE 1, dual-channel signal translating means is provided for two stereophonically-related signals A and B which are applied to respective channel input terminals 7 and 8 from microphones 9 and 10 respectively, representing any suitable stereophonic sound signal source. As is known, the stereophonically-related audio-frequency signals A and B may be derived from common sound source (not shown) by proper placement of the two microphones, generally in spaced left and right positions as indicated. The input terminals 7 and 8 are coupled to input resistors 11 and 12 through input coupling capacitors 13 and 14 respectively, one terminal or end of each of said resistors being connected to common ground 15 for the signal translating system.

In the present example, the input resistors 11 and 12 serve as variable volume-control means for the respective signal channels, being provided respectively with movable output contacts 16 and 17 which are arranged to be operated in unison through mechanical connection means indicated by the dotted connection line 18. Input signals from the two channels are applied to a single electron discharge device or tube 20 which is of the multi-grid type such as a pentode as shown. This has a cathode 21 and an anode 22 providing a single electronic stream, and between which are three interposed electrodes or grid elements comprising a first grid 23, a second grid 24 and a third grid 25. In the pentode-type tube shown, these are the first control grid, the screen grid, and the second control grid respectively.

The two control grids 25 and 23 are connected respectively through input circuit leads 27 and 28 with the volume control contacts 16 and 17 for the ganged volume-control means. The input circuit for each channel is completed from chassis or system ground 15 through a cathode resistor 29 to the cathode 21, the cathode resistor being provided with a suitable audio-frequency by-pass capacitor 30. In this manner both grids 23 and 25 are self-biased from the cathode resistor 29. If one of the grids requires different bias than the other a tapped cathode resistor may be employed with connections from the tap to one of the grids in a manner well-known.

In the present system, the anode 22 and the screen grid 24 are maintained at a positive D-C potential with respect to the cathode to establish the electron discharge or space current flow from the cathode thereto. The total cathode or space current is varied by the signal voltage on the first control grid 23, and the division of the space current between the anode 22 and the screen grid 24 is varied differentially by the signal voltage on the second control grid 25, without varying the total cathode or space current.

The anode 22 and the screen grid 24 are connected to the end terminals 32 and 33 respectively of the primary winding 34 of an output coupling transformer 35. The transformer primary 34 provides an output coupling impedance element connected between the anode and the screen grid and having an intermediate terminal 36 which may be the center tap in the present example. The terminal 36 is connected through a lead 37 with a terminal 38 on the primary 39 of a second output transformer 40 for the B channel, and through the winding to the opposite terminal 41 and a positive operating current supply lead 42 which is connected therewith. The negative terminal of the B supply is connected to system ground as is understood, and in this manner the anode and screen grid are maintained at a positive potential with respect to the cathode. The positive supply connection for the anode and screen grid is through the winding 39 and the lead 37 to the terminal 36 and thence through each portion of the primary winding 34 to the terminals 32 and 33 and respective anode and screen grid connections therewith.

In the present example the primary windings 34 and 39 represent the channel output impedance elements for the A and B channels which are coupled to respective channel output terminals 43 and 44 for any utilization circuit or further channel signal translating elements. In the present example the coupling means between the primary winding or output impedance element 34 and the output terminals 43 is a secondary winding 45 for the transformer 35, which is connected with the terminals 43 as shown. Likewise a secondary winding 46 coupled to the primary winding or output impedance element 39 is connected with the output terminals 44.

In the present example the channel output terminals 43 and 44 are connected respectively with audio-frequency power amplifiers 47 and 47′ connected respectively for driving channel output loudspeaker or sound reproducing means 48 and 49. Through this system, as will be described, sound signals from the sources 9 and 10 are translated and applied to the respective channel output device 48 and 49 through the dual channel signal translating system and the single electron discharge amplifying device 20 which is common to both channels in a single signal translating stage.

The operation of the amplifier of FIGURE 1 is as follows: One of the signals (B) is applied from the source 10 through the input circuit between the first control grid 23 and the cathode 21 and causes a corresponding variation in the cathode current. The current path may be traced through the primary winding 39 to the terminal 36, and through the two section primary winding 34 to the anode 22 and the screen grid 24. Thus the B signal is developed across the primary winding 39 of the B channel output transformer 40 and is applied to the output terminals 44, and thence through the amplifier 47′ to the output device 49. The B signal produces no current variation in the secondary winding 45 because the current flowing in the two sections of the primary winding 34 produce equal and opposite voltages across secondary 45 and therefore no output signal at the terminals 43 or the output device 48.

The other signal (A) applied to the input terminals 7 from the signal source 9 and thence through the input circuit for channel A to the second control grid 25 and the cathode 21, causes a change in the anode current through one section of the primary winding 34, accompanied by a change in the opposite direction in the screen grid current in the other section of the primary winding 34, with no appreciable change in the cathode or total space current. This push-pull action produces a corresponding (A) output signal across the primary winding 34 and this in turn is applied to the output terminals 43 and sound output device 48 through the amplifier 47. No A signal is applied to the B channel output terminals because the A signal produces no current change through winding 39. It is assumed that the tube geometry is such that the plate current is equal to the screen grid current when the tap terminal 36 on the primary winding 34 is at the center.

A single multigrid tube may thus constitute a common amplifier stage for a dual-channel signal translating system and provide for the separate channel translation of signals therethrough. This may be termed a nonmatrixing circuit in which the (A) and (B), or left and right, signals are applied to the two input grids 25 and 23 equally and the transconductance between the first control grid 23 and the screen grid 24, between the first grid 23 and the anode 22, and between the second control grid 25 and the anode are equal, and the circuit impedances $R_p$, $R_{sg}$ and $R_k$ are likewise equal. In the present example the anode impedance $R_p$ is that provided by the primary winding 34 between the terminals 36 and 32, the screen-grid impedance $R_{sg}$ is that provided by the transformer primary 34 between the terminals 36 and 33, and the cathode impedance $R_k$ is the impedance of the primary winding 39.

It may also be assumed that the transconductance of the tube 20 between the control grid 25 and the screen grid 24 is equal and opposite to that between the control grid 25 and the anode 22. Under these conditions, dual-channel or stereophonically-related input signals applied to the control grids 25 and 23 provide an amplified signal output voltage at the terminals of the output impedance 34 (and the secondary terminals 43) for the A channel, and an equally amplified output signal at the terminals of the output impedance 39 or (the secondary terminals 44) for the B channel. In other words the signal translating system of FIGURE 1 provides effective stereo signal tracking for the two channels through the common signal amplifier device 20.

In the modification shown in FIGURE 2, to which attention is now directed along with FIGURE 1, the A and B or channel input signals are applied to the input terminals 7 and 8 through left and right-channel signal supply circuits 51 and 52 respectively from any suitable dual-channel or stereophonic signal source (not shown). Such signal source may be any stereophonic signal generating or translating apparatus of the type herein referred to, such as a stereophonic phonograph pickup for phonograph record reproduction for example.

In the present example, the respective input circuit leads 27 and 28 for the control grids 25 and 23 are connected directly with end terminals 53 and 54 respectively for the input grid resistors 11 and 12. The volume-control means for the system is provided elsewhere and the full input voltage is thus applied to the control grids from the input terminals 7 and 8 in the present example. The input circuits and the amplifier tube 20 are otherwise connected and operate the same as in the circuit of FIGURE 1.

Additional amplification of the translated signals in the circuit of FIGURE 1 is provided by the external amplifiers 47 and 47′ following the output terminals 43 and 44. In the circuit of FIGURE 2, signal amplification is provided in the output coupling circuits of the single stage amplifier 20 and preceeding the output terminals 43 and 44 for the two channels. The output transformers 35 and 40 are the same as for the circuit of FIGURE 1 and are coupled to the amplifier tube 20 through the intermediary of an amplifier stage comprising two differentially and additively connected amplifier tubes 56 and 57. These tubes may be of the triode type as indicated, having cathodes 58 connected to system ground 16 through a suitable common self-bias resistor 59 provided with a signal bypass capacitor 60.

The control grids 61 and 62 of the amplifier tubes 56 and 57 are resistance coupled respectively to the output anode 22 and the screen grid 24 of the tube 20 through suitable signal coupling capacitors 63–64 across the impedance of output coupling resistors 65 and 66 connected respectively in circuit with the anode 22 and the screen grid 24 and to a common junction or supply terminal 67. The terminal 67 in turn is connected with a positive operating-current supply lead 68 for the system through a common series coupling impedance or resistor element 69, which is variable by means of a movable contact 70, as shown. The grids 61 and 62 are connected to the self-bias source 59 in the cathode circuit through suitable grid resistors 71 and 72, respectively, which are connected to ground 15 and thus to the ground end of the cathode resistor 59.

The output anodes 75 and 76 of the amplifier tubes 56 and 57 are connected respectively through output anode circuits 77 and 78 with the terminals 32 and 33 of the output transformer primary 34. As in the circuit of FIGURE 1, the terminal 36, which is the intermediate terminal on the primary winding, is connected through a circuit lead 37 with the high signal potential terminal 38 of the primary winding 39 for the channel output transformer 40. The opposite terminal 41 is connected with the supply lead 42 as the source of positive operating current for the plate circuits of the amplifier tubes 56 and 57.

The secondary 45 of the output transformer 35 is connected with the output terminals 43 and is adapted to be connected directly with the output loudspeaker 48 for the channel A signals since amplification is provided within the amplifier system preceding the output transformer 35. Likewise in the B signal channel, the secondary 46 of the output transformer 40 is connected with the output terminals 44 and is adapted to drive the output loudspeaker device 49 which is connected directly with the terminals 44.

The operation of the circuit of FIGURE 2 is substantially the same as that of the circuit of FIGURE 1, except that dual-channel amplification of applied signals is provided between the amplifier tube 20 and the output transformers 35 and 40. It will be seen that the collector electrodes, which are the anode 22 and the screen grid 24, are coupled effectively to the terminals 32 and 33 through the amplifier stage comprising the tubes 56 and 57. Thus the A channel signal applied to the control grid 25 varies the space current distribution between these electrodes, and applies a push-pull signal to the control grids 61 and 62 of the tubes 56 and 57, and thence to plate circuits and the terminals 32 and 33 on the primary winding 34. Through the coupling with the secondary winding 45 this provides amplified left-channel or A signals at the terminals 43 and at the loudspeaker 48.

The cathode or total space current, controlled by the first grid 23 of the amplifier tube 20 in response to applied right-channel or B signals, serves to vary the anode and screen currents substantially equally and in the same sense, and thus vary the signal voltages on the grids 61 and 62 in the same sense. This causes the anode currents to vary substantially equally in phase, and therefore serves to control the total anode or output plate current in the primary winding 39 of the output transformer 40 and thus transfer the B signal to the output loudspeaker 49. Because of the plate current balance in the primary winding 34 no B signal output is applied to the secondary winding 45.

The resistor 69, likewise in the common supply connection for the screen and anode elements of the amplifier 20, provides an impedance element which is responsive to the B signal currents, and not responsive to the A signal. The resistor 69 may be adjusted to adjust the amplitude of the B signal applied to the amplifiers 56 and 57 and to the output channel B loudspeaker 49 and serve as a stereo or channel balance with respect to the A signal. The B channel signal is adjusted in amplitude to balance the A signal amplitude by this simple circuit arrangement, while at the same time sufficient amplification may be attained to drive the channel sound output devices, such as the speakers 48 and 49, directly from the output transformers of the system without the intermediary of additional amplifiers as in the circuit of FIGURE 1.

Referring now to the circuit of FIGURE 3, the single-tube dual-channel amplifier circuit shown is similar to that of FIGURE 1, providing one signal translating channel between the input terminals 7 and the output terminals 43, and a second signal translating channel between the input terminals 8 and the output terminals 44. In the present circuit the signal source connections and the output load circuits are omitted although it should be understood that any suitable signal source and output load or utilization means may be connected therewith. Like the circuit of FIGURE 2 the input volume-control means is omitted and the input signals are derived through the input circuit leads 27 and 28 directly across the input resistors 11 and 12 respectively from the terminals 7 and 8. In the present example the B signal is applied to the terminals 7 and the A signal is applied to the terminals 8 and are derived from corresponding output terminals 43 and 44 as indicated.

The main difference between this circuit and that of FIGURE 1 is the use of a beam-deflection type of tube as represented by the tube 80. This has a cathode 81 connected to system ground through the cathode resistor 29 and bypass capacitor 30 and a divided anode comprising two anode elements 82 and 83, which act as the positive collector electrodes in the present example and therefore are connected through plate leads 84 and 85 respectively with the terminals 32 and 33 of the coupling transformer primary 34. The center tap 36 is connected through the lead 37 to the primary 39 of the second channel output transformer at the terminal 38, and thence from the terminal 41 to the positive operating current supply lead 42. The secondary winding 46 of the transformer 40 is coupled to the primary winding 39 and connected to the output terminals 44 for the A channel, in the present example. Likewise, the secondary winding 45 of the coupling transformer 35 receives the B signal output and is connected with the output terminals 43.

The beam-deflection tube 80 may be of a type known commercially as the 7360 tube, having an input or first control grid 86 between the cathode and the anode electrodes together with a screen grid 87, and a pair of deflection electrodes 88 and 89 which operate to deflect the electron beam from the cathode between the anode or plate electrodes 82 and 83 in response to signals.

In the present example, the A-channel signal input lead 28 is connected with the control grid 86 and the B signal input circuit is connected with the deflection electrodes, electrode 88 being connected with the lead 27 and the electrode 89 being connected to system ground and thence to the ground side of the input circuit for the B signals. The screen grid 87 is connected to a source of positive operating potential indicated by the supply lead 90.

In the beam-deflection tube circuit, the A signal on the control grid 86 serves to vary the total cathode current without effecting any deflection of the cathode beam between the anode electrodes 82 and 83. Therefore, the total cathode current variation is applied to the output transformer 40 and appears at the output terminals 44. Thus the first grid 86 operates to provide output signals as described for the circuit of FIGURE 1.

The deflection electrodes 88 and 89, in response to applied B signals at the terminals 7, causes a deflection or change in the division of the total cathode current between the collector electrodes or anode elements 82 and 83, and a push-pull signal current varies in the output transformer primary 34 which is transferred to the secondary 45 and the output terminals 43. The control electrodes 86 and 88–89 thus operate in the same manner as the control electrodes 23 and 25, respectively, in the circuit of FIGURE 1. However in the present case, the application of the A and B signals are reversed in the translating channels of the amplifier to indicate that either of these signals may be translated interchangeably through either channel in any case.

As in the preceding embodiments of the invention, the cathode or space current variation is determined by, or is a function of, the signal potential between the first grid 86 and the cathode and is independent of the signal potential between the second control electrode 88 and the cathode or ground. The division of the cathode or space current between the anode or collector electrodes 82 and 83 is determined by, or is a function of, the signal potential between the second control electrode 88 and the cathode, and is independent of the signal potential between the first control electrode 86 and the cathode.

In the dual-channel signal translating circuits of FIGURES 1, 2 and 3, the dual-channel or stereophonically-related signals are applied to and are derived from the translating channels without any matrixing or other transformation. If the applied signals are of the composite type, such as stereophonically-related $(A+B)$ and $(A-B)$ signals, the push-pull and single-ended circuits of the signal translating stage of the present invention may be followed by a usual form of matrixing circuit, such as that involving two transformers with secondary connections in a suitable matrixing circuit configuration, as shown for example in the circuit of FIGURE 4 which is similar in most respects to that of FIGURE 1. Alternatively individual impedances in circuit between each collector electrode and cathode may be employed as shown in FIGURE 5, since one collector-cathode current represents the sum of the signals and the other collector-cathode current represents the difference between the signals applied to the two control grids. The summing and differencing of the sum and difference of two signals provides the two original signals. In other words $(A+B)+(A-B)=2A$ and $(A+B)-(A-B)=2B$. This will be explained more fully hereinafter. Attention is now directed to FIGURE 4.

In an FM-multiplex radio signal receiver of the stereophonic type, the FM detector and multiplex detector output circuits 95 and 96 are connected to the input terminals 7 and 8 respectively of the dual-channel single-tube amplifier as indicated, to apply the $(A+B)$ FM signal modulation component and the $(A-B)$ subcarrier signal modulation component to the control grids 25 and 23 respectively of the single tube amplifier. Both the FM detector output signal and the multiplex detector output signal is at audio frequency and stripped of the pilot and subcarrier sidebands. As indicated in the present example, the amplifier tube may be provided with a fourth grid 97 located between the first control grid 23 and the grid or collector electrode 24. The grid 97 is connected to receive positive operating potential from the supply lead 42 and provides effective reduction in cross talk between the two channels because the cathode current is made independent of the instantaneous potential of the second grid 24.

In this circuit, as in FIGURE 1, the collector or output electrodes 22 and 24 are connected in push-pull relation to the balanced primary 34 of the output transformer 35 and in parallel relation to the primary 39 of the output transformer 40, the latter being connected between the positive operating potential supply lead 42 and the intermediate terminal 36 on the primary winding 34. Up to this point the operation of the system is the same as that of FIGURE 1 in the translation of applied signals from the input terminals 7 and 8 to the output transformers 35 and 40. Since the applied signals are composite signals $(A+B)$ and $(A-B)$ these are translated through the transformers 35 and 40 and applied to the modified secondary windings 98 and 99 which are adapted for coupling directly with the output sound-reproducing devices 48 and 49 and to provide a matrixing circuit as will be described. These modified secondary windings are here provided in lieu of the windings 45 and 46 of the circuit of FIGURE 1. The secondary 98 has two end terminals 100 and 101 with an intermediate or center tap 102. The secondary winding 99 has two terminals 103 and 104 and may be of substantially the same impedance as half of the winding 98. The loudspeaker or output devices 48 and 49 are connected serially through output circuit leads 106 and 107 between the terminals 100 and 101 of the secondary winding 98. The secondary winding 99 is connected between the terminal 102 and a junction terminal 108 between the series-connected speakers 48 and 49, through circuit leads 110 and 111 respectively.

The $(A+B)$ signal translated through the single-stage dual-channel amplifier appears between the terminals 100 and 110 of the secondary 98 and the $-(A+B)$ signal appears between the terminals 101 and 102 on the secondary 98. These are matrixed with the $(A-B)$ signal between the terminals 103 and 104 of the secondary winding 99 which is connected between the two sound output devices 48 and 49 and the intermediate terminal of the secondary 98. Therefore the sound output device 48 receives the A signal and the sound output device 49 receives the B signal as indicated, from this matrixing circuit connection for the secondary windings. In other respects the amplifier of FIGURE 4 operates in the same manner as described for the circuit of FIGURE 1.

The single-stage dual-channel amplifier or signal translating stage of the present invention may be provided to effect both translation and matrixing of composite stereophonically-related signals, such as the $A+B$ and $A-B$ signals applied to the circuit of FIGURE 4. For a consideration of this feature of the invention, attention is now directed to FIGURE 5 showing a modification of the output circuit of FIGURE 4.

In this modification, an A-channel output transformer 35*a* having primary winding 34*a* and secondary winding 45*a* is connected in the anode 22, cathode 21 circuit, so that the anode-cathode current flows through the primary winding 34*a*. In a like manner, a B channel output transformer 40*a* is disposed in the screen grid 24, cathode 21 circuit so that the screen-grid-cathode current flows through the primary winding 39*a*. As has been previously explained, the anode current is a function of the sum of the signal potentials supplied to the control grids 23 and 25, i.e.: $(A-B)+(A+B)=2A$, and the screen-grid current is a function of the difference between the signal potentials supplied to the grids 23 and 25, i.e.:

$$(A-B)-(A+B)=2B$$

Accordingly the A stereo signal is developed across the secondary 45*a* and the B stereo signal is developed across the secondary 46*a*. In other respects the circuit of FIGURE 5 operates the same as that of FIGURE 4.

Attention is now directed to FIGURE 6 wherein a complete stereophonic radio signal receiver is shown and provided with a stereophonic detector circuit in accordance with the invention. The receiver may be of any suitable type, and in the present example comprises a signal converter 115 connected with signal pickup means, such as an antenna 116, and coupled to an intermediate-frequency amplifier 117 in the conventional manner. The IF amplifier output circuit includes a tuned coupling or transformer winding 118 for an IF coupling transformer 119 and a shunt tuning capacitor 120 therefor.

The IF coupling transformer is provided with two tuned channel branch circuits 121 and 122 for the two stereophonically-related modulation or signal components of the received carrier wave or signal, the circuit 121 being for an $(A-B)$ angle-modulated signal component and the circuit 122 being for an $(A+B)$ amplitude-modulated signal component in the present example. The receiver may thus be considered to be of the broadcast type operating in the AM broadcast band, and in which the carrier wave or signal is amplitude-modulated by the $(A+B)$ signal component for compatible operation of standard monophonic receivers, and in which the carrier wave or signal is concurrently angle-modulated (FM) by the $(A-B)$ stereo signal component. The demodulated signals are translated and matrixed in an output circuit network 125 for application to the channel output terminals 126 and 127 for the respective A and B signals which are derived from the network 125.

The remainder of the dual-channel signal translating means for the receiver may include separate-channel power amplifiers 128 and 129 connected with respective channel output loudspeakers 130 and 131 for the A and B channels. The amplifier 128 is connected to common ground 132 for the system and to the movable output contact 133 of a volume-control potentiometer resistor 134 connected across between the detector circuit output terminals 126 for the A channel. Likewise the amplifier 129 is connected to system ground and to the movable output contact 136 for a volume-control potentiometer resistor 137 connected between the detector circuit output terminals 127 for the B channel. The two volume-control contacts 133 and 136 may be connected mechanically, or ganged, as indicated by the dotted connection line 139, to operate in unison, thereby to control the gain in both channels in tracking relation as is conventional.

The single-tube detector or signal translating element 124 of the receiver is of the pentode type as in the preceding embodiments of the invention and comprises a cathode 140 and an anode or plate 141 between which are located first, second and third grids or grid elements 142, 143, and 144. As in the preceding embodiments, the first and third grids are signal input or control grids, and the second grid may be considered to be a screen grid. The cathode, at a terminal 146 is connected to system ground 132 through a cathode resistor 147 having a signal bypass capacitor 148 connected therewith.

The tuned signal circuit 122 of the transformer 119 comprises a secondary winding 150 provided with a shunt tuning capacitor 151. This is connected between the first control grid 142 and a terminal 152 which is connected through a resistor 153 to the cathode terminal 146, thereby completing the cathode circuit connection from the control grid 142. The resistor 153 is provided with an R–F bypass capacitor 155 to ground 132 from the terminal 152.

The tuned signal circuit 121 of the transformer 119 comprises a second tuned secondary winding 156 provided with a shunt tuning capacitor 157 and connected between the second control grid 144 and system ground 132, or the cathode, through the bypass capacitor 148. The grid circuit from the grid 144 is thus completed through the cathode resistor 147. The secondary windings 156 and 150 are mutually inductively coupled as indicated, for the transfer of signals thereto from the primary or coupling winding 118.

Considering now the operation of the detector or signal translating system shown, the IF signal developed across the secondary winding 150 or the circuit 122 is coupled between the grid 142 and the cathode 146 by way of the bypass capacitors 155 and 148. The signal has an amplitude variation $(A+B)$ and an angle variation $(A-B)$. The amplitude variation $(A+B)$ causes a corresponding variation in the cathode current of the device 124. The angle variation of the signal is not effective to vary the cathode current. Because the tuned circuit 121 is resonant at the center frequency of the IF wave or signal i.e., the frequency of the developed signal when the $(A-B)$ modulation equals zero, the IF signal potential applied between grid 144 and cathode 140 is in quadrature with respect to the IF signal potential applied between grid 142 and cathode 140 when the IF signal is at center frequency. When the IF signal is angle modulated, i.e., $(A-B)\neq 0$, the instantaneous phase of the potential supplied to grid 144 lags or leads the potential supplied to grid 142 by an amount determined by the magnitude, and in a sense determined by the magnitude, and in a sense determined by direction of the instantaneous departure of the IF wave from the resonant frequency of the tuned circuit 121. Accordingly, the instantaneous plate or anode current of the device 124 varies in sense and magnitude as a function of the sense and magnitude of the instantaneous frequency departure of the wave developed across tank circuit 121 from the resonant frequency of tank circuit 122. Likewise the screen-grid 143 to cathode current varies in a corresponding but opposite manner from the plate or anode current. Thus the plate and screen currents vary in phase with respect to the $(A+B)$ modulation and out-of-phase with respect to the $(A-B)$ modulation.

The capacitors 176 and 177 are effectively IF bypass elements, whereby the IF component of plate and screen currents are returned to the cathode by way of the capacitor 148 without developing an appreciable IF voltage across the resistors 168, 169, 170 and 147. The capacitor 148 is both an IF and an audio-frequency bypass (i.e., low impedance compared to the resistor 147). The modulating frequency variation in plate or anode current flows through resistors 168 and 170, and the capacitors 172 and 148, to the cathode, and the modulating frequency variation in screen current flows through the resistors 169 and 170, and the capacitor 172 and 148, to the cathode. The $(A-B)$ component is not developed across the resistor 170. The magnitude of the $(A+B)$ voltage component developed across the resistor 170 adds to the components developed across resistors 168 and 169. By suitable choice of the ohmic values of the resistors 168, 169 and 170, signal A may be developed across the output terminals 126 and signal B may be developed across the output terminals 127.

Automatic-gain-control potentials may be derived from the detector and applied to the converter and intermediate-frequency amplifier means, for the control of such elements in response to variations in the average amplitude of the received carrier wave. For this purpose therefore, in the present example, the terminal 152 is connected to the gain control circuits of the IF amplifier 117 through an AGC lead 160 and filter means comprising a series resistor 161 and a shunt bypass capacitor 162 to ground. The AGC potential is also further applied to the converter 115 through a connection lead 163 and filter means comprising a series resistor 164 and shunt capacitor 165 to ground. This may be considered to represent any suitable AGC system for the receiver for which the detector circuit of the present invention is adapted to provide D-C signal-responsive control voltage.

The anode 141 is connected with an anode output circuit lead 142 and is coupled to the high signal-potential terminal of the output terminals 126 for the A channel through an output coupling capacitor 182 connected between the lead 142 and said terminal as shown. The other of the output terminals 126 is connected to system ground 132.

The output anode 141, as in the preceding embodiments of the invention, is one of two output or collector electrodes of which the other is the screen or second grid 143. The latter is, therefore, likewise connected with an output circuit lead 145 and coupled to the high signal-potential one of the output terminals 127 for the B channel, through an output coupling capacitor 146 connected between the lead 145 and said terminal. The other terminal of the pair of output terminals 127 is connected to system ground 132.

With this improved and simplified output circuit network, the A signals are derived directly from the anode connection and the B signals are derived directly from the second or screen grid connection fully matrixed in the network from the IF modulated signals applied to the stage from the input circuits 122 and 121 respectively. This network includes a first impedance means connected between the circuit leads 142 and 145, or effectively between the anode and screen grid elements, and comprising two series-connected resistor elements 168 and 169, and second impedance means comprising a resistor 170 connected between the junction terminal 171 of the resistor elements 168 and 169 and the cathode 140, through system ground 132 and a bypass capacitor 172 connected serially between the resistor 170 and system ground as shown. A terminal 173 at the junction of the resistor 170 and the bypass capacitor 172 is supplied with positive operating current from a supply lead 174 for the screen grid and anode electrodes. The operating current is conducted through the resistor 170 to the terminal 171 and thence in opposite directions, or differentially through the resistors 168 and 169, to the anode and grid electrodes 141 and 143 respectively. The capacitors 182 and 146 operate as blocking capacitors to prevent the D-C operating current from flowing to the output terminals, as is understood. The audio bypass capacitors 172 and 148 serve effectively to place the low signal potential end of the impedance element or resistor 170 at the terminal 173 at substantially cathode potential with respect to the signal translation through the system. The capacitance values of the RF bypass capacitors provided between system ground and each of the output circuit leads 142 and 145 as indicated at 176 and 177 respectively may be chosen to provide deemphasis as noted hereinbefore.

The detector system shown in the present receiver circuit provides stereophonic signal output for the left and right, or channel A and B, signals from a received RF signal that may be simultaneously modulated by stereophonically-related information, and is useful in any radio signal receiving system of this type. In the present example, a single multigrid tube or electron discharge device 124 is connected in a circuit that provides two-phase (180°) demodulated $(A-B)$ output for the angle modulation or FM or phase modulation output, and one-phase demodulated $(A+B)$ output information that is readily matrixed by the same output circuit network 125 to provide the desired sound signal information in two distinct channels. The circuit features simplicity, high output and ease of initial adjustment as will be noted from its configuration and circuit elements.

The tuned circuit 122 may be considered to be at an intermediate frequency of 455 kc. and the RC grid coupling means 153–155 provides a short time constant circuit (for the modulating frequencies) across which the amplitude modulation $(A+B)$ signal is developed. This is thus applied between the first control grid 142 and the cathode and the D-C component thereof is also applied to the AGC circuit 160 which has a relatively longer time constant as is known. For this purpose the resistor 161 may presently be considered to have a resistance of one megohm and the capacitor 162 to have the capacity of .01 mfd. Also by way of example, the capacitor 155 may have a capacity of .0001 mfd. and a resistor 153 may have a resistance of 250,000 ohms.

The demodulated $(A+B)$ signal on the grid 142 serves to vary the total cathode or space current, and in accordance with the prior description of a similar circuit configuration, this signal appears across the common output resistor or impedance element 170 as indicated on the circuit. It thus effectively applied between the intermediate tap terminal 171 and the cathode 140 in the output network 125.

The angle or frequency-modulation component $(A-B)$ is derived due to the phase difference between the signals on the two control grids 142 and 144 through the inductive coupling indicated by the secondary windings 150 and 156 and the tuning of the circuits to the same frequency of 455 kc. in the present example. Due to the phase difference, the control grid 144 serves to modulate the space current distribution to the anode 141 and the screen grid 143 or the output electrodes, and thus varies the current distribution through the resistor or impedance elements 168 and 169 from the intermediate terminal 171 without effectively varying the total space current through the impedance or resistor element 170. Thus the demodulated $(A-B)$ signal component appears across the impedance element 168, as indicated, and the demodulated $-(A-B)$ component appears across the impedance or resistor element 169 as indicated. It will be seen that because of the output terminal connections between both collector electrodes (screen grid 143 and anode 141) and ground or cathode, the A and B signals are matrixed to appear at the terminals 126 and 127 respectively. For adjustable matrixing balance the resistor 170 may be made variable by means of a movable contact 180 thereon connected with the terminal 173. The $(A+B)$ signal component may thus be made to balance the $(A-B)$ and $-(A-B)$ signal components for precise matrixed balance.

The demodualted amplitude-modulation signal $(A+B)$ is, therefore, reflected as a variation of the total cathode or space current which flows through the impedance element 170 and is adjusted to a value of proper matrix with the $(A-B)$ and the $-(A-B)$ signal components to provide the desired separate A and B signals at the output terminals 126 and 127 and at the output sound-reproducing means 130 and 131 respectively.

Whereas the $(A+B)$ component has been described as being developed across the resistor 170, the entire $(A+B)$ component comprises a portion developed across the resistor 168, and a portion developed across the resistor 169. For example, if the incremental plate current and screen current are equal for the $(A+B)$ component and the $(A-B)$ component is zero, the cathode current (equal to the sum of the anode and screen currents) flows through the resistor 170 while half of the cathode current flows through the resistor 168 and the other half through the resistor 169.

In this or any signal translating circuit embodying the invention and providing effectively automatic matrixing for composite signals, the three impedance elements 168 and 169 and 170, which may be designated as $R_p$, $R_{sg}$, $R_k$, respectively, are preferably equal in value so that if the pentode tube 124 has equal $G_M$, or transconductance, from the first grid 142 to the screen grid 143 and anode 141, and equal and opposite transconductance from the third grid 144 to the screen grid 143 and the anode 141, the transconductance from the third grid 144 to the anode 141 should be substantially triple the transconductance from the first grid 142 to the anode 141. Then when the sum of the left and right signals $(A+B)$ are applied to one of the control grids 142 and 144, and the difference $(A-B)$ is applied to the other, the individual left and right, or A and B, signals are developed between the cathode (or system ground) and the anode and between the cathode (or system ground) and the screen grid as above described.

Thus a simplified and effective matrixing detector may be provided for stereophonically-modulated carrier waves in a stereo signal receiver, and the same principles may be applied in the translation and matrixing of other stereophonically-related and composite signals in any signal translating system in accordance with the invention.

What is claimed is:

1. In a dual-channel signal translating system, the combination of, input circuits for two stereophonically-related signals, a single electron-discharge signal-translating device having a cathode, a pair of electron collector electrodes, and a pair of control electrodes, means for maintaining each collector electrode at a positive potential with respect to the cathode to set up space-current flow between the cathode and the collector electrodes, the device being further characterized in that one of the control electrodes is adapted to vary the current flow from the cathode as a function of the potential difference between the one control electrode and cathode and the other of the control electrodes is adapted to vary the division of the current flow from the cathode to the collector electrodes substantially without affecting the total space current flow from the cathode as a function of the potential difference between the other electrode and the cathode, first impedance means in circuit between the collector electrodes, second impedance means in circuit between said cathode and an intermediate tap on said first impedance means, individual signal output circuits for said signals coupled with said impedance means, and means coupling said control electrodes each with one of said input circuits.

2. In a dual-channel signal-translating system, the combination as defined in claim 1, wherein the signal output circuit for one of the signals is coupled to the first impedance means and the signal output circuit for the other of said signals is coupled to the second impedance means.

3. In a dual-channel signal-translating system, the combination as defined in claim 1, wherein the electron-discharge device is of the type having at least a plate, a screen grid, a first control grid and a second control grid in which one of the collector electrodes is the plate and the other collector electrode is the screen grid, and wherein the control electrodes are first and second control grids thereof.

4. In a dual-channel signal-translating system, a signal translating stage comprising in combination, a single electron-discharge signal-translating device having a cathode, a pair of electron collector electrodes, and a pair of control electrodes, means for applying two stereophonically-related input signals one to each of said control electrodes, means for maintaining each collector electrode at a positive potential with respect to the cathode to set up space-current flow between the cathode and the collector electrodes, the device being further characterized in that one of the control electrodes is adapted to vary the current flow from the cathode as a function of the potential difference between the one control electrode and cathode and the other of the control electrodes is adapted to vary the division of the current flow from the cathode to the collector electrodes substantially without affecting the total space current flow from the cathode as a function of the potential difference between the other electrode and the cathode, and means for deriving a first output signal responsive to variations in the division of current flow from the cathode to said collector electrodes and means for deriving a second output signal responsive to the variations in total cathode current flow.

5. In a dual-channel signal translating system, a signal translating stage as defined in claim 4, wherein the output signal circuits include first output coupling impedance means connected in circuit between the collector electrodes and second output coupling impedance means connected in circuit between said cathode and an intermediate tap on said first impedance means.

6. In a dual-channel signal-translating system, a signal translating stage as defined in claim 4, wherein the signal output circuit for one of the signals is coupled to one of said collector electrodes and the signal output circuit for the other of said signals is coupled to the other of said collector electrodes.

7. In a dual-channel signal-translating system, a signal translating the stage as defined in claim 4, wherein the signal output circuit for one of the signals is additively coupled and the signal output circuit for the other of the signals is differentially coupled to the collector electrodes.

8. In a dual-channel signal translating system, the combination of; two signal input circuits; and electron-discharge device having a cathode, anode, a pair of control electrodes serially disposed in the space path therebetween, and a third electrode disposed between the control electrodes; means for maintaining the third electrode and anode at a positive potential with respect to the cathode; means coupling one of said control electrodes to one of said input circuits and the other of said control electrodes to the other of said input circuits; first, second, and third impedance elements; circuit means coupling the first impedance element to the anode, the second impedance element to the cathode, and the third impedance element to the third electrode; means interconnecting said impedance elements at a common junction, and a pair of individual utilization circuits coupled to said elements to derive individual translated signals therefrom in response to applied signals at said input circuits.

9. In a dual-channel signal translating system the combination of, input circuits for a pair of signals, an electron-discharge device having a cathode, a pair of electron collector electrodes and a pair of control electrodes, means to set up space current flow from the cathode to the collector electrodes, the device being further characterized in that one of the control electrodes in response to signal energy impressed thereon is adapted to vary the space current flow from the cathode and the other in response to signal energy impressed thereon is adapted to vary the division of space current flow to the collector electrodes substantially without altering the space current flow from the cathode, means coupling one of the control electrodes to one of said input circuits and the other control electrodes to the other of said input circuits, additive and differential combining means coupled to said collector electrodes to provide respectively a first signal output representative of the instantaneous magnitude of the sum of the currents flowing to the collector electrodes and a second signal output representative of the instantaneous magnitude of the difference between the currents flowing to the collector electrodes.

10. In a dual-channel signal translating system, the combination as defined in claim 9, wherein the additive combining means includes an adjustable element whereby the relative magnitudes of the first and second signals may be selectively controlled.

11. A translating system for stereophonic signals including in combination: a source of stereophonic signals, a pair of sound reproducers, an electron-discharge device having a cathode, a pair of electron collector electrodes, and a pair of control electrodes, means for maintaining the collector electrodes at a positive potential with respect to the cathode to set up an electron discharge between the cathode and the collector electrodes, the device being further characterized in that one of the control electrodes is adapted to vary the electron discharge from the cathode as a function of the potential difference between the one control electrode and cathode and the other of the control electrodes is adapted to vary the division of the electron discharge from the cathode to the collector electrodes substantially without affecting the total electron discharge from the cathode as a function of the potential difference between the other electrode and the cathode, first impedance means in circuit between the collector electrodes, second impedance means in circuit between said cathode and an intermediate tap point on said first impedance means, means coupling said control electrodes to said signal source for receiving applied signals therefrom, and output circuit means coupling said sound reproducers with said first and second impedance means to derive and reproduce stereophonic sound from said applied signals.

12. In a dual-channel signal translating system for two stereophonically-related composite signals of the type $(A+B)$ and $(A-B)$, the combination of a pair of input circuits for said signals; an electron-discharge device having a cathode, anode, a pair of control electrodes serially disposed in the space path therebetween, and a third electrode disposed between the control electrodes; means coupling one of said control electrodes to one of said input circuits and the other of said control electrodes to the other of said input circuits; a first impedance element connected between the anode and the cathode, a second impedance element connected between the third electrode and the cathode; means for supplying operating currents to said anode and third electrode through the respective impedance elements connected therewith by maintaining said anode and third electrode each at a positive potential with respect to the cathode, and a pair of individual utilization circuits coupled to said impedance elements to derive individual translated A and B signals therefrom in response to said composite signals applied at said input circuits and corresponding resultant variations in the sum and difference of the operating currents flowing to said anode and third electrode.

13. In a stereophonic signal receiver, a dual-channel signal translating detector comprising in combination, means providing input circuits for a pair of stereophonically modulated signals of the type having composite (A+B) and (A−B) modulation, an electron-discharge device having a cathode, a pair of electron collector electrodes and a pair of control electrodes, means connected to set up space current flow from the cathode to the collector electrodes, the device being further characterized in that one of the control electrodes in response to signal energy impressed thereon is adapted to vary the space current flow from the cathode and the other in response to signal energy impressed thereon is adapted to vary the division of space current flow to the collector electrodes substantially without altering the space current flow from the cathode, means coupling one of the control electrodes to one of said input circuits and the other control electrode to the other of said input circuits for deriving two channel signals for demodulation, and a dual-channel output circuit network including individual impedance means connected with said collector electrodes to provide a first demodulated output (A) signal in one channel and a second demodulated output (B) signal in the other channel in response to variations in the sum and difference of the space current flowing to the collector electrodes.

14. A detector circuit for a wave amplitude-modulated by a first signal and concurrently angle-modulated by a second signal including in combination: an electron discharge device having a cathode, a first control electrode, a second control electrode and a pair of collector electrodes; means for maintaining each of said collector electrodes at a positive potential with respect to the cathode to set up a flow of space current thereto from the cathode; a source of waves concurrently amplitude and angle-modulated by said first and second signals, means coupling said first control electrode and cathode to said source to develop a potential therebetween and to vary the flow of space current from the cathode to the collector electrodes at the source frequency in response to modulation variations on said source, means including phase-shifting means for coupling said second control electrode and cathode to said source to impress a potential therebetween of a relative phase with respect to the potential between first control electrode and cathode determined by the angle modulation on the source, and impedance means coupled to the collector electrodes to provide a pair of output signals respectively corresponding to said first and second signals.

15. A detector circuit as defined in claim 13, wherein the source of waves is amplitude modulated by the sum of a pair of stereophonically-related signals and concurrently angle-modulated by their difference, and wherein the pair of output signals are the stereophonically-related signals.

16. A dual-channel audio-frequency amplifier stage for a pair of stereophonically-related signals including in combination: an electron-discharge device including a cathode, a control grid, a pair of electron collector electrodes and an electron-discharge deflection electrode; means for establishing electron flow between the cathode and said collector electrodes; a pair of sources of stereophonically-related signals; means coupling one of said sources to said control grid, means coupling the other of said sources to said deflection electrode, and a pair of output utilization means coupled to said collector electrodes.

17. A dual channel signal translating system comprising an electron discharge device having a cathode, a pair of electron collector electrodes and a pair of control electrodes, means for applying stereophonically-related signals to said control electrodes, the geometry of said device being such that the transconductance of the device between one of said control electrodes and one collector electrode, the transconductance between said one control electrode and the other collector electrode, and the transconductance between the other control electrode and the other collector electrode all are equal, and means for obtaining stereophonically-related signals from the collector electrodes of said discharge device.

18. A dual channel signal translating system comprising an electron discharge device having an electron emitter, a pair of electron collector electrodes and a pair of control electrodes, one control electrode of said pair of control electrodes being disposed between said pair of electron collector electrodes, said electron discharge device being capable of producing an electron flow from said electron emitter to said pair of collector electrodes, means for applying the first of a pair of stereophonically-related signals to a first one of said control electrodes for varying the total electron flow from said electron emitter to said first and second electron collectors, means for applying the second of said pair of stereophonically-related signals to said second control electrode for varying substantially only the division of electron flow between said pair of electron collector electrodes and without substantially varying the total amount of said electron flow, thereby to cause a flow of electrons to one of said collector electrodes corresponding to a function of the sum of said stereophonically-related signals and to cause a flow of electrons to the other of said collector electrodes corresponding to a function of the difference of said stereophonically-related signals, and output circuit means connected to said collector electrodes.

19. In an electrical signal processing system where in it is desired to perform two distinct functions in response to two different signals;

an electron tube having a single cathode and a plurality of electron-receiving elements, first electrode means for controlling the intensity of the electron flow and second electrode means for controlling the relative impingement of electrons on said receiving elements;
means for supplying a first input signal to said first electrode means;
means for deriving a first output signal resulting from the effect of said first input signal on said electron flow;
means for supplying a different and independent second signal to said second electrode means;
and means for deriving a second output signal resulting from the effect of said second input signal on said electron flow.

20. In an electrical signal processing system wherein it is desired to perform two distinct functions in response to two different and independent signals;

an electron tube having a single cathode, an anode, and a plurality of grids in succession between said cathode and said anode;
means for supplying a first input signal to the first grid;
means for deriving a first output signal from at least one of the other grids;
means for supplying a different and independent second input signal to another of said grids;
and means for deriving a second output signal from said anode.

21. The combination as defined in claim 19 wherein said first electrode means controls the intensity of the electron flow as a function of the potential difference between said first electrode means and said cathode, wherein said second electrode means controls the relative impingement of electrons on said receiving elements as a function of the potential difference between said second electrode means and said cathode, wherein said first output signal deriving means derives said first output signal in response to variations in the intensity of said electron flow, and wherein said second output signal deriving means derives said second output signal in response to variations in the relative impingement of said electrons on said receiving elements.

22. The combination as defined in claim 19 wherein said plurality of electron receiving elements includes at least one anode, wherein said first and second electrode means comprise two of a plurality of control grids included between said cathode and said anode, wherein said first output signal deriving means derives said first output signal from said anode, and wherein said second output signal deriving means derives said second output signal from at least one of said electron receiving elements.

References Cited

UNITED STATES PATENTS

| | | | |
|---|---|---|---|
| 2,302,867 | 11/1942 | Hunt | 325—443 |
| 2,570,016 | 10/1951 | Van Loon | 325—443 XR |
| 2,743,323 | 4/1956 | Wlasuk | 330—126 |
| 3,017,576 | 1/1962 | White | 330—148 |
| 2,474,978 | 7/1949 | Holland | 330—147 X |
| 2,571,431 | 10/1951 | Enslein | 330—117 |
| 2,698,379 | 12/1954 | Boelens et al. | 179—1.3 |
| 3,025,474 | 3/1962 | Popaduk | 330—147 X |

KATHLEEN H. CLAFFY, *Primary Examiner.*

R. LINN, *Assistant Examiner.*

U.S. Cl. X.R.

330—147, 148, 126

UNITED STATES PATENT OFFICE

CERTIFICATE OF CORRECTION

Patent No. 3,420,954 January 7, 1969

Henry M. Bach, Jr.

It is certified that error appears in the above identified patent and that said Letters Patent are hereby corrected as shown below:

Column 11, lines 63 and 64, cancel "and in a sense determined by the magnitude, ".

Signed and sealed this 17th day of March 1970.

(SEAL)
Attest:

Edward M. Fletcher, Jr.
Attesting Officer

WILLIAM E. SCHUYLER, JR.
Commissioner of Patents